*John Raddin's*
*Improvement in Car Wheels.*
74939
PATENTED
FEB 25 1868
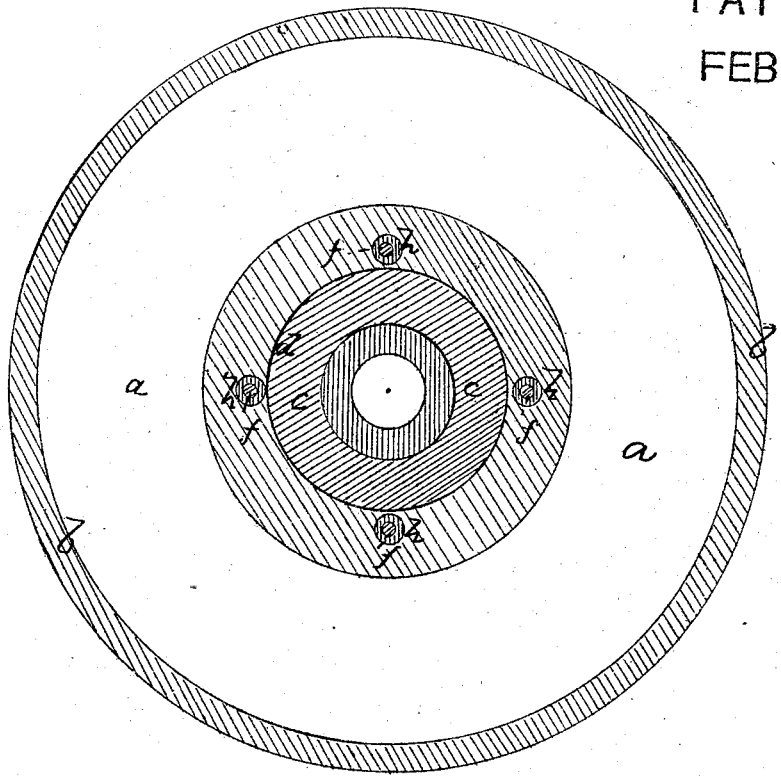
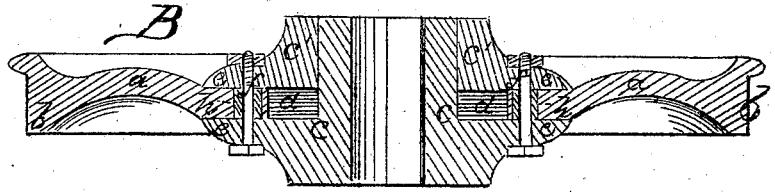
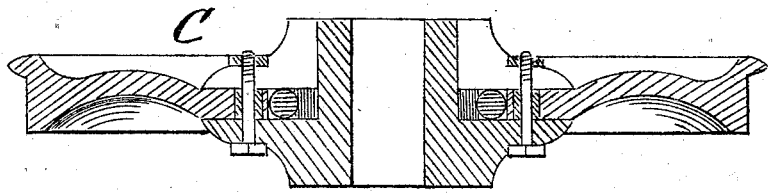
Witnesses
M. W. Frothingham
C. Warren Brown
John Raddin,
by
Crosby Halstead Gould
Attys

United States Patent Office.

JOHN RADDIN, OF LYNN, MASSACHUSETTS.

Letters Patent No. 74,939, dated February 25, 1868.

IMPROVED CAR-WHEEL.

The Schedule referred to in these Letters Patent and making part of the same.

TO ALL WHOM IT MAY CONCERN:

Be it known that I, JOHN RADDIN, of Lynn, in the county of Essex, and State of Massachusetts, have invented an Improved Car-Wheel; and I do hereby declare that the following, taken in connection with the drawings which accompany and form part of this specification, is a description of my invention, sufficient to enable those skilled in the art to practise it.

The invention relates to the construction of cast railway-car wheels, with particular reference to a provision for radial yield between the hub and tread of the wheel.

The invention consists, in connection with making the hub of flanged pieces independent from the web and bolted together and upon the opposite surfaces of the web, of cushioning the hub relatively to the tread, by means of rubber or other elastic packing surrounding the bolts.

It also consists in making the hub and web of independent castings, when the central part of the web has flat or parallel faces, to the opposite sides of which the flanges projecting from the hub are bolted, and when the hub is made sectional, or in two pieces, the central part of one of which extends through the web, and through and fits in the central part of the opposite hub-piece.

(This latter feature is shown in United States Letters Patent, No. 64,796, granted to me, May 14, 1867, but it forms no part of the invention therein claimed, such patent relating entirely to the interposition of rubber or similar elastic material between the hub and the web.)

The drawings represent a car-wheel embodying my invention, A showing a side view, but with one of the hub-pieces removed; B, a central cross-section.

$a$ denotes the web, $b$ the periphery or tread, $c\ c'$ the hub. The web and tread are cast integral, and the web has a large central opening, $d$. Each hub-piece $c\ c'$ is made with a flange, $e$, the inner surface of which is flat, and fits upon a corresponding flat or plane surface, on the adjacent side of the web $a$. The hub-piece $c$ extends through the wheel, and the hub-piece $c'$ fits thereupon, as seen at B. Through the web, adjacent to the hub-flanges, is a series of bolt-holes $f$, for reception of bolts $g$, which extend through the two flanges $e$, and the web, as seen at B, the bolt-holes through the flanges being made to correspond in diameter to the size of the bolts, or so that there shall be no lateral play between the bolts and the web, while each bolt-hole through the web is made larger than the bolt, and receives a tube or packing of rubber or other elastic material, $h$, a space being left between the web and the hub for slight radial movement of the hub towards the periphery of the wheel. The parts being secured together by the bolts, and the nuts thereupon, as seen at B, it will readily be seen that the stress produced by any pressure between the hub and the tread is received upon the packing surrounding the bolts, while the construction and relative arrangement of the parts of the hub, the web, and their connections, are such as to insure security and strength in the wheel.

A rubber ring may be interposed between the hub and web, as seen at C, (and as shown in my patent above referred to,) but by cushioning the bolts as described this may be dispensed with.

A wheel may also be constructed having the specific arrangement of the sectional hub and the wheel-web, (the bolt-holes $f$ being in such case made of corresponding or approximate diameter to the bolts,) but I prefer the construction shown at B, with the employment of the elastic packing. This packing may be made of rubber, or its compounds, or of gutta percha, soft wood, or other equivalent material. I consider rubber or a rubber compound, however, to be the most reliable.

This construction for a cast-metal wheel facilitates the casting of a wheel possessing requisite strength from hub to tread, because, the web and tread being cast independently from the hub, and being of about equal thickness throughout, the casting cools off equally throughout, whereas in the common car-wheel, in which the hub is cast with the wheel, the great thickness of the hub causes it to cool off more slowly than the web portion, which strains and weakens the casting.

I claim, in combination with the web $a$, the sectional hub $c\ c'$, and the bolts $g$, constructed and arranged as shown and described, the elastic packing $h$, and the bolts, substantially as and for the purpose set forth.

JOHN RADDIN.

Witnesses:
J. B. CROSBY,
FRANCIS GOULD.